(12) United States Patent
Perni et al.

(10) Patent No.: US 6,508,592 B1
(45) Date of Patent: Jan. 21, 2003

(54) DEVICE FOR MEASURING AND ADJUSTING PRELOADING ON BEARINGS

(75) Inventors: Federico Perni, Via Pintura (IT); Luciano Pizzoni, Foligno (IT); Brett Masters, Cambridge, MA (US)

(73) Assignee: Umbra Cuscinetti SpA, Foligno (IT)

( * ) Notice: Subject to any disclaimer, the term of this patent is extended or adjusted under 35 U.S.C. 154(b) by 6 days.

(21) Appl. No.: 09/707,271

(22) Filed: Nov. 7, 2000

(30) Foreign Application Priority Data

Mar. 15, 2000 (IT) ........................................ RM00A0134

(51) Int. Cl.[7] ............................................. F16C 33/66
(52) U.S. Cl. ........................................... 384/517; 384/1
(58) Field of Search ........................... 384/517, 1, 500, 384/519, 563

(56) References Cited

U.S. PATENT DOCUMENTS

| | | | | |
|---|---|---|---|---|
| 4,850,719 A | * | 7/1989 | Moseley et al. ................ 384/1 |
| 5,221,146 A | * | 6/1993 | Maruyama ................... 384/447 |
| RE34,310 E | * | 7/1993 | Duncan ....................... 384/517 |
| 5,397,183 A | * | 3/1995 | Lu et al. ......................... 384/1 |
| 5,564,840 A | * | 10/1996 | Jurras et al. ............. 29/898.09 |
| 6,283,637 B1 | * | 9/2001 | Schnur et al. ................. 384/1 |

* cited by examiner

Primary Examiner—Pam Rodriguez
(74) Attorney, Agent, or Firm—Browdy and Neimark

(57) ABSTRACT

A device for measuring and adjusting pre-loading on bearings, measuring and adjusting both the mounting and operating loads, wherein elements for applying a preloading and return elements are positioned to constitute a single actuator organ, comprising two ring elements for distributing the preloading, whereof at least one is destined to act against the outer race of a bearing and containing interposed between them a kinematic chain imparting thereon a thrust determined by the action of two or more piezoelectric or magnetostrictive element for applying the preloading and return elements; to the actuator organ being associated an annular loading cell connected in an external feedback control system for measuring and adjusting the preloading.

14 Claims, 3 Drawing Sheets

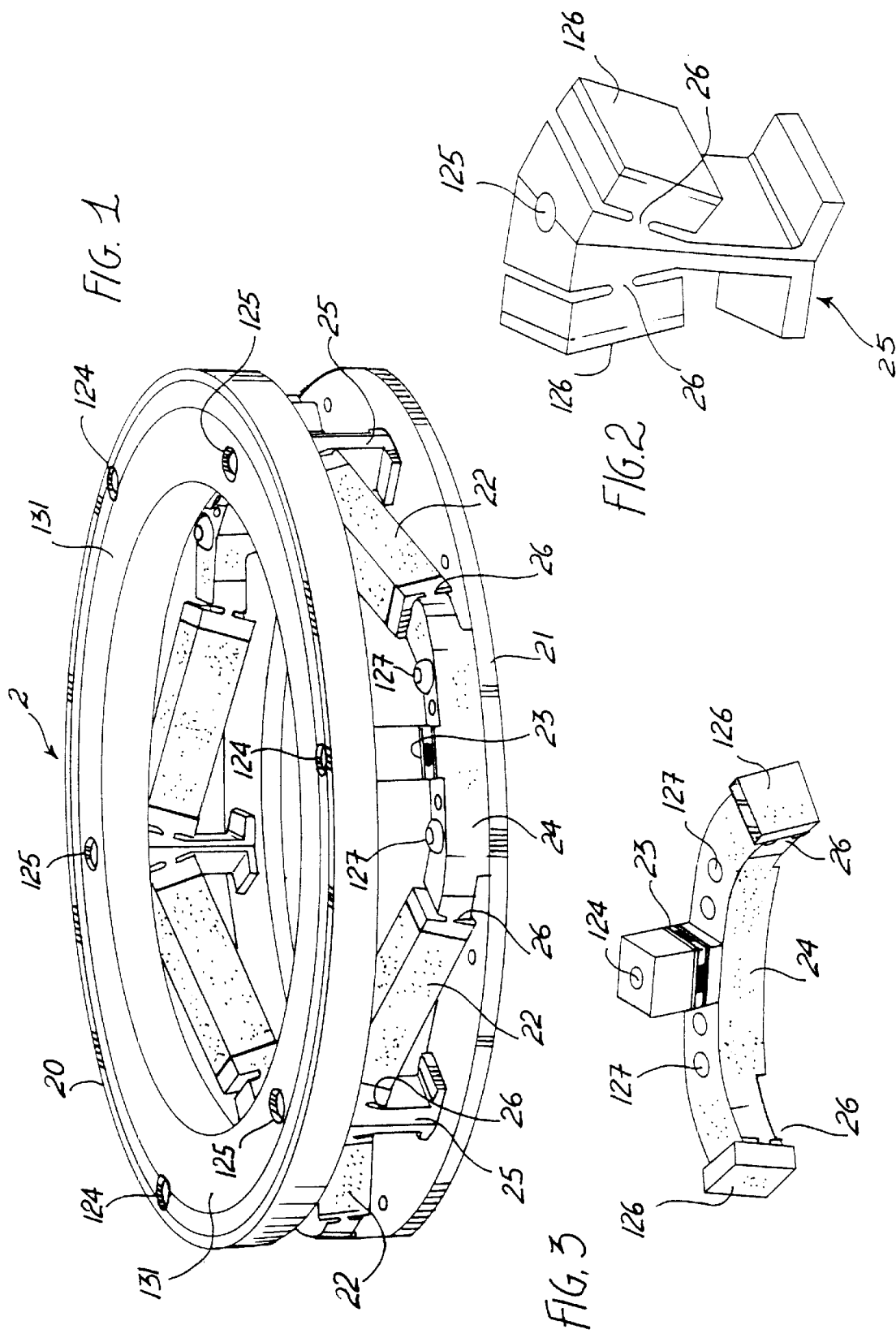

DEVICE FOR MEASURING AND ADJUSTING PRELOADING ON BEARINGS

BACKGROUND OF THE INVENTION

The present invention relates to a device for measuring and adjusting preloading on bearings, i.e. for measuring and adjusting mounting and operating loads on bearings, which employs piezoelectric and magnetostrictive means to apply such preloading. As is well known, piezoelectricity is the phenomenon whereby some crystalline bodies, generically called piezoelectric crystals, are electrically polarized as a consequence of a mechanical deformation of elastic nature, or vice versa are elastically deformed if subjected to the action of an electrical field. This second effect, known as inverse piezoelectric effect or Lippmann effect, is the one used in the present invention. Similarly, for the same invention it is possible to make use of the magnetostriction phenomenon, consisting of the fact that the dimensions of a body vary when it is magnetized or when in any case its magnetization is varied. In the remainder of the description, materials subject to the piezoelectric effect are mentioned, but this is not to be taken as limiting.

The characteristics of these materials have found application, among other fields, also in the means for preloading bearings, where they replaced purely mechanical adjustment devices able to provide a variable stiffness for a bearing assembly. Examples of this kind are represented by machining on electrical mandrels or drill heads where the bearing assembly must have high stiffness and low speed of rotation, typical of roughing operations, and low stiffness for high speeds of rotation, as in finishing operations. As is well known, another factor is represented by thermal expansion which can lead, in the rolling areas, to operating overloads which impact on the working life of the bearings.

The U.S. Pat. No. 4,850,719 in the name of Moseley et al., for instance, describes a variable stiffness bearing which uses piezoelectric means to apply a variable preload force to the bearing. The piezoelectric means preferably used are piezoelectric wafers, positioned between two bearings around a shaft and alternatively connected to alternating voltage and to ground to allow the wafers to become distorted in a manner directly proportional to the potentials applied. The wafers are positioned consecutively side by side and, with their deformation due to a variation of the applied potential, they exert a longitudinal force, parallel to the axis of the bearings. Moseley's device has no means for adjusting the preloading, and thus serves solely to adjust the stiffness of the bearing.

Also known, in any case, is a device for adjusting the preloading for a main shaft bearing from the publication of Japanese Patent No. 8-35220 in the name of Hitachi Seiki Co. Ltd. It comprises means, generally springs, for imparting a thrusting force in a single direction from a side of the outer race of a bearing, means for conferring a preloading, in general to the rolling support through the outer race of the bearing pressing the other side of the outer race in the opposite direction against the thrusting means. Moreover, a unit is provided for measuring the preloading applied to the outer race by the preloading conferring unit, and control means including means for storing the optimal preloading value for the speed of rotation of the main shaft, means for comparing the optimal preloading, extracted from the data storing means for values corresponding to the speed of rotation of the main shaft, with an effective preloading measured by the preloading measuring means.

The aforementioned known device describes a device for adjusting the preloading in which the thrusting means and the counteracting or elastic return means are distinct components of the device, positioned in respectively opposite parts of the bearing subjected to stiffening.

A device of this kind is particularly complex and not always applicable to a bearing on already operating shafts.

Also known is a device for adjusting the preloading for a bearing, disclosed in Japanese Patent No. 8-25106 in the name of Honda Giken Kogyo. The adjustment of the preloading in this case is obtained by means of pressure in the axial direction by means of a piezoelectric element positioned on the side of the bearing that sustains a rotating shaft. The device for adjusting the preloading comprises a sensor to measure the load acting on the outer race of the bearing and means for commanding a voltage applied to the piezoelectric element as a function of the measured load. The means for applying the preloading are represented by a cylinder whose piston applies a force on a slide applied against the outer race at the opposite side of the piezoelectric element. In the Honda device, it is possible to adjust the preloading on a pair of beatings thanks to respective sensors, but the Honda device comprises, like the Hitachi device, thrusting means that are distinct from the counteracting or elastic return means and positioned on opposite parts relative to the bearings. As in the Hitachi device, also in the Honda device the piezoelectric means for applying the preloading is formed by wafers positioned mutually side by side. They exert a direct action on the bearings, concentrated in some points of the outer race. The means for conferring the preloading are separated from the thrusting means and thus the whole preloading device is substantially divided into at least two parts located on the opposite sides of the bearings. In the Honda device the sensors are displacement sensors positioned in contact with the peripheral surface of the outer race of the bearing; they are able to allow a measurement of the load on the bearing only if it is assumed that the inner races remain fixed in position. Since this cannot be verified with certainty, the indeterminate nature of the measurement leads to an inadequate operation of the entire device.

The positioning of the sensors, located in proximity to the various bearings, and their number increase the complexity of the device, both in terms of construction and operation.

As stated previously, such complexity in known devices makes it impossible to introduce them on existing bearing assemblies without substantial modifications and heavy adaptations of the component parts.

SUMMARY OF THE INVENTION

The present invention therefore aims to overcome the drawbacks of the devices for adjusting the preloading known from the prior art.

An aim of the present invention is to obtain a device of the type mentioned above, in particular of the type using piezoelectric and magnetostrictive means, which has a mechanically compact structure allowing it to be installed on bearing assemblies replacing or being added to the external spacer, in existing or newly designed machines.

Another aim of the invention is to obtain a device that is able to measure the axial load on the bearings due to tightening during the assembly phase, to the working axial thrusts, to the centrifugal forces and the thermal expansions of the machine whereon the bearings are mounted.

Another aim of the invention is to obtain a device that is able to suit the stiffness of the bearing assemblies according to the type of machining operation (drilling, boring, milling, contouring ,etc.), to the type of tools employed, to the type of material to be machined or to the precision to be obtained on the finished piece.

A further aim of the invention is to obtain a device that allows to adjust the load thanks to a feedback control system between the current measurement and the predefined and stored load values according to the dimensions that cause the load itself to vary.

The invention, as it is characterized by the claims that follow, solves the problem of providing a device for measuring and adjusting preloading on bearings surrounded by a casing, of the type comprising means for applying a preloading, in the form of one or more piezoelectric or magnetostrictive elements, able to apply a thrust defining a preloading on the outer race of bearings, reaction means for applying a force counteractive the preloading force, sensor means for instantaneously measuring the load and feedback control system for adjusting said load, which, from a general point of view, is characterized in that said means for applying a preloading and said reaction means are positioned to constitute a single actuator organ, comprising two ring elements for distributing the preloading, opposite and coaxial to the shaft, a first ring and a second ring, whereof at least one is destined to act against the outer race of a bearing and containing, interposed between them, two or more piezoelectric or magnetostrictive means for applying the preloading and return means associated to connecting elements between said ring elements; to said actuator organ being operatively adjacent an annular loading cell connected with an external feedback control system for measuring and adjusting said preloading.

BRIEF DESCRIPTION OF THE DRAWINGS

Further features and advantages of the invention shall become more readily apparent from the detailed description that follows of an embodiment, illustrated purely by way of non limiting indication in the accompanying drawings, in which:

FIG. 1 shows a perspective view of an actuator organ of the device for measuring adjusting the preloading on bearings according to the present invention;

FIG. 2 shows a perspective schematic view of a detail of the actuator organ of

FIG. 3 shows a perspective schematic view of another detail of the actuator organ of FIG. 1;

DESCRIPTION OF THE PREFERRED EMBODIMENT

Figure 5:
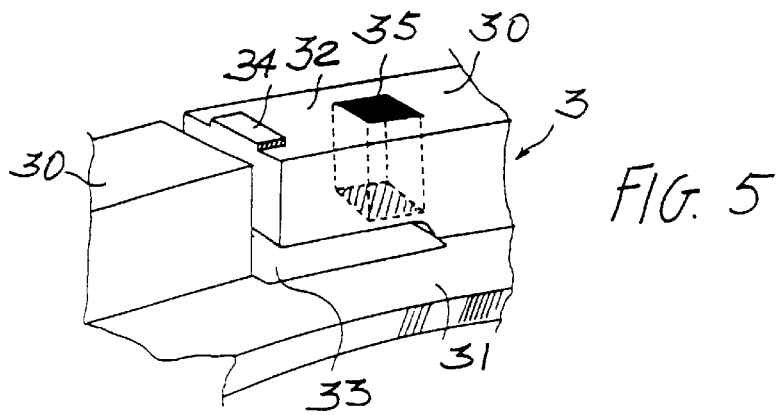
FIG. 5 shows a view of a detail of the loading cell of FIG. 4.

With reference to the figures, a preferred but not exclusive embodiment of the device for measuring and adjusting the preloading on bearings according to the present invention is shown. In particular, from FIGS. 6 through 8, which show the application of the device, globally indicated as 1, on a bearing assembly 10 about a main shaft 11, it is evident that it is constituted by an actuator organ 2 and by a loading cell 3.

With reference to FIG. 1, which is an axonometric view of the actuator device 2, two ring elements 20, 21 for distributing the preloading, destined to be mutually opposite and mounted coaxially to the main shaft 11, contain interposed between them a kinematic chain imparting on them a thrust determined by the action of two or more piezoelectric or magnetostrictive means for applying the preloading, generically indicated as 22, and return means, generically indicated as 23. The return means 23 are substantially thrust means serving essentially to counteract the means 22 for applying the preloading. The return means 23 are associated to connecting elements 24 between the ring elements 20, 21.

The means 22 for applying the preloading are formed by single elements or by wafers of piezoelectric materials or of a material operating according to a known magnetostrictive effect. In FIG. 1 the means 22 for applying the preloading are shown, by way of example, in the form of bars with quadrangular sections, but they may have any different shape suitable for the purpose.

According to the invention, in the currently preferred embodiment, said actuator organ 2 comprises, interposed between said ring elements 20, 21 two or more preloading units constituted each by two preloading means 22 mutually opposite and acting in a converging manner on a connecting element 24, shown in particular in FIG. 3. Each preloading means 22 is supported in an articulated manner, at one of its ends, by the connecting element 24, and at its other end by a strut, generically indicated as 25 and shown in particular by itself, in a possible preferred embodiment, in FIG. 2. Advantageously, in an embodiment, each strut 25 is formed by two "C" shaped sections coupled mutually opposite along their core or formed in a single piece of identical shape. Each strut 25 is mounted in bridge-like fashion between the two ring elements 20, 21 so as to be fastened rigidly with screws 125 to the ring element 20 and to be only set against the other ring element 21. Each strut 25, in the illustrated embodiment, is advantageously destined to support in articulated fashion at both its sides two opposite preloading means 22 afferent to two consecutive preloading units thereby constituting a circumferential kinematic chain of the preloading units in the gap defined by said two ring elements 20, 21.

Each preloading means 22 is positioned inclined between the two ring elements 20, 21 only relative to their axis, or, as shown in FIG. 1, both relative to their axis and relative to their radial direction.

The preloading means 22 are also articulated at their respective ends to a connection element 24 and to a strut 25 by means of hinges 26. In an embodiment, each of these hinges 26 is obtained by means of a reduction in section of a portion 126 for joining and sustaining the preloading means 22 with the respective connecting elements 24 and with the strut 25. Naturally, said hinges 26, shown by way of example as virtual hinges, functionally cooperating with said return means, can constructively be obtained in the form of actual hinges. Each connecting element 24 is formed, for example, similar to a T section bar, fastened with the free end of its core with screws 124 to the ring element 20 and with the wings, at the end whereof project said joining and sustaining portions 126, with screws 127 to the ring element 21. Therefore, the preloading elements 22 converge towards the ends of the wings of the connecting element 24. In this way, the deformation increasing the longitudinal dimension of a pair of preloading elements 22 of a preloading unit applies a thrust on the two elements 20, 21 away from each other, against the action of the return means 23 in the form of a spring or other elastic return means. The inclined and converging disposition of the preloading elements 22 determines, on the connecting element 24, a resulting force multiplying the preloading thrust, thereby increasing the displacement effect obtainable from a simple axial disposition of the preloading elements 22.

The return means 23 is positioned transversely to join the connecting element 24 fastened on the ring element 21 and the ring element 20. The return means 23 comprises elastic means presenting a reduced resistance to traction in the direction in which the two ring elements 20, 21 are moved apart and with sufficient characteristics of elastic return.

Figure 4:
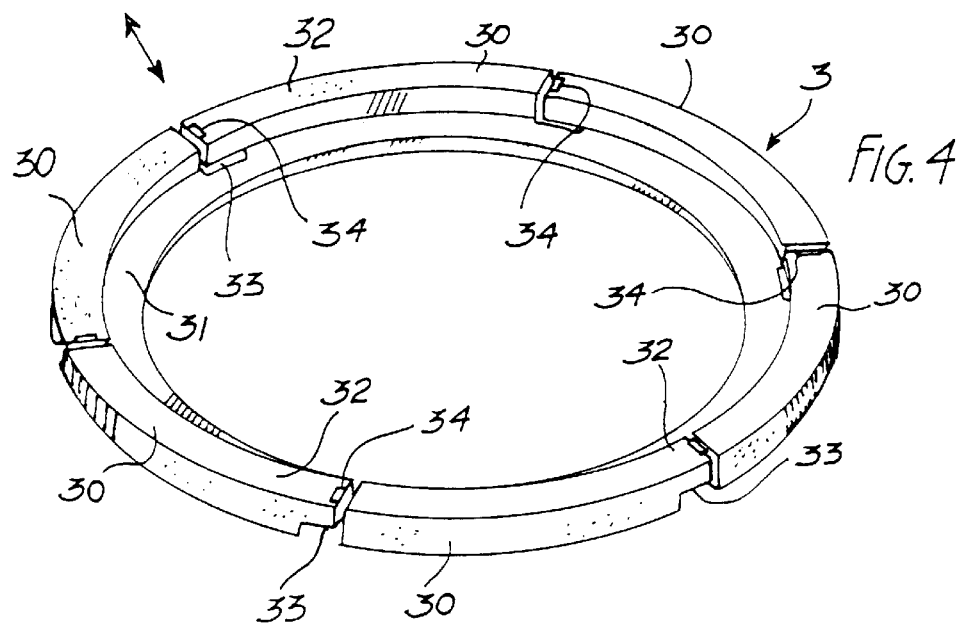
FIG. 4 shows a top schematic view of a loading cell of the device for measuring and adjusting the preloading on bearings according to the present invention.

With reference to the FIGS. 4 and 5, the loading cell 3 is constituted by an annular element bearing on its face oriented towards the outer race of a bearing a multiplicity of identical circumferential joists arranged in succession on an annular body 31. Each of said joists 30 presents, consecutive to the others, one of its ends 32 with reduced section and shaped in overhang in correspondence with a concavity 33 presented by the annular body 31. In correspondence with the upper edge of said overhang end 32 (FIG. 5) are provided respective projections 34 destined to bear with pressure against the outer race of a bearing, whilst, by way of example, said annular body 31 finds useful support seat in a circumferential depression 131 presented by the outer surface of the first ring element 20 of the actuator organ 2 (FIG. 1). In correspondence with the base of each of said overhang ends 32, in corresponding multiplicity, are provided sensors—strain gages 35 positioned in pairs in bridge fashion on both sides of the overhang ends 32.

Figure 8:
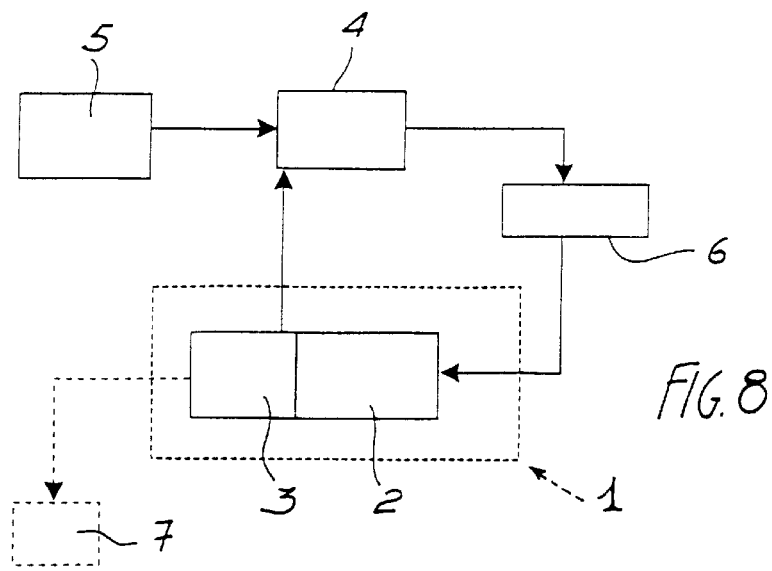
FIG. 8 shows a block diagram of a feedback control system that employs the device according to the present invention.

The loading cell 3 is therefore able directly to transmit, through said projections 34, the preloading pressure determined by the adjacent actuator organ 2 on the outer ring of a bearing, measuring its value and any consequent displacements through the flexion of said overhang ends 32 measured by the pair of sensors—strain gauges 35 which, in a manner known in itself, send the respective signals to an external feedback control system for measuring and adjusting the preloading, or the mounting and operating loads on the bearing, shown in the diagram of FIG. 8.

Figure 6:
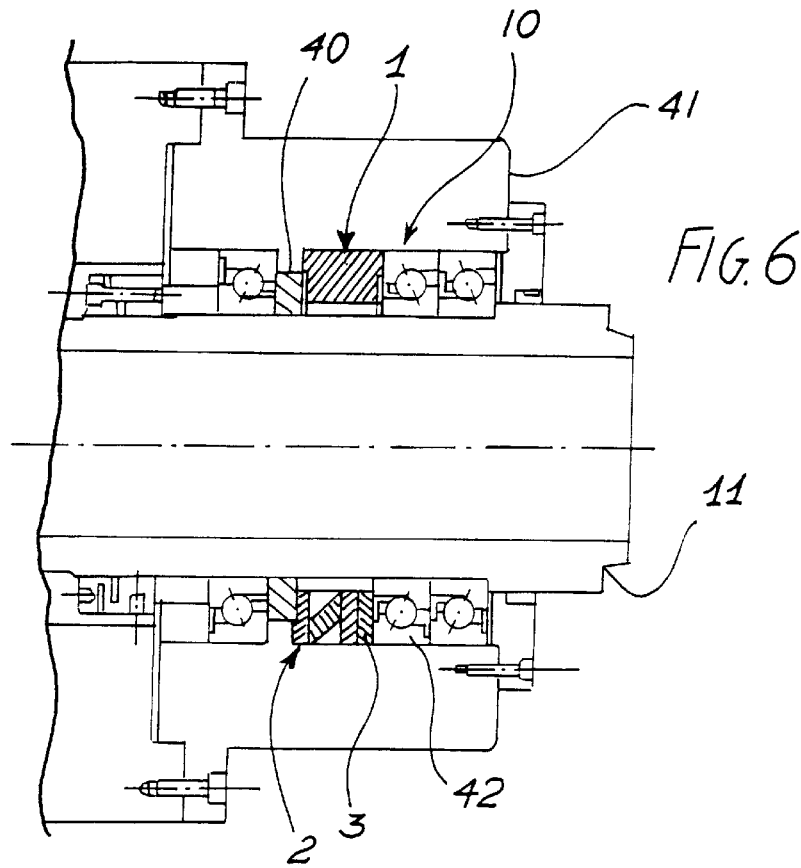
FIG. 6 shows a schematic axial section of a first embodiment of the device for measuring and adjusting the preloading on bearings according to the present invention.
Figure 7:
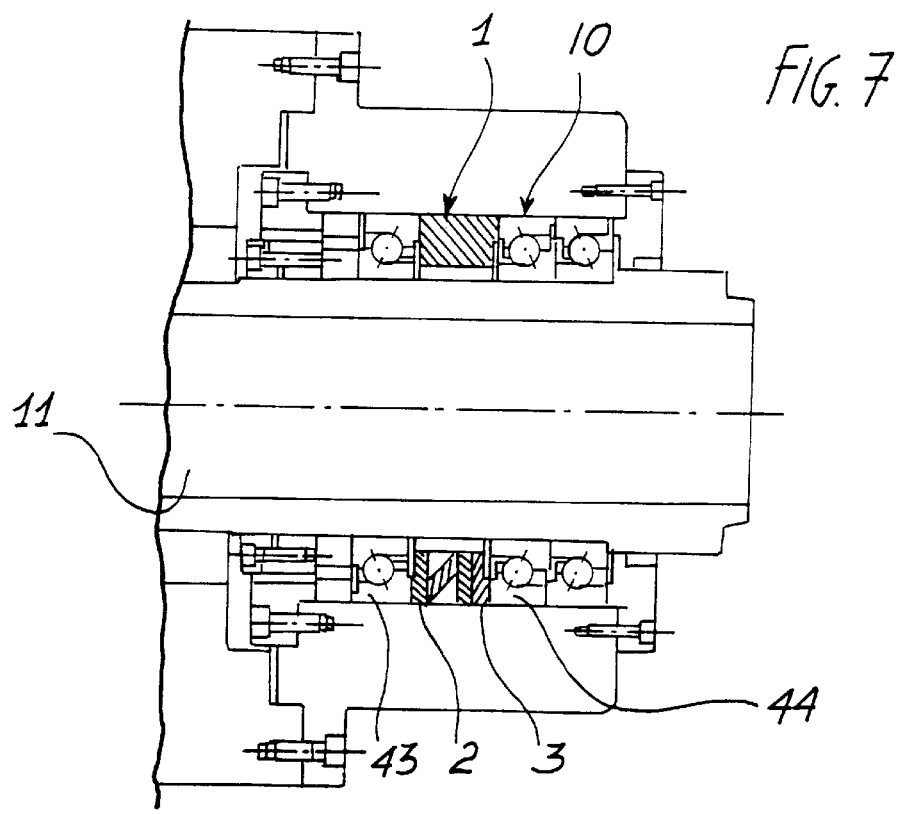
FIG. 7 shows a schematic axial section of a second embodiment of the device for measuring and adjusting the preloading on bearings according to the present invention.

FIGS. 6 and 7 show two applications of the device according to the invention to a bearing assembly about the main shaft 11. With reference to FIG. 6 the actuator organ 2 is interposed between a spacer 40 integral with the casing 41 which surrounds the shaft and the loading cell 3, in contact against the outer race 42 of a bearing. Superiorly, the device 1, comprising the actuator organ 2 and the loading cell 3, are shown with simple dashed line, whilst inferiorly they are distinctly shown schematically to represent the actual shape of the device.

With reference to FIG. 7, the actuator organ 2 is located between the outer race 43 of a first bearing and the outer race 44 of a second bearing, with the interposition of the loading cell 3.

The device, constituted by the actuator organ 2 and by the loading cell 3, is part of an external feedback control system for measuring and adjusting the preloading shown in the diagram of FIG. 8. It further comprises a control unit 4, having upstream a calibration unit 5 and downstream a power supply unit 6 for the actuator organ 2. The loading cell 3 in turn is connected to the control unit 4. The loading cell 3 is further connected to a unit 7 for recording the load conditions.

The advantages of the device according to the present invention are summarized below.

The compactness of the device as an autonomously operating organ allows for its easy installation on existing or newly designed machines. It has positive repercussions on a reduction in fabrication and installation costs.

The device is able, with its kinematic mechanism for multiplying the preloading thrust, completely to meet the demand for motion to compensate for thermal and centrifugal effects and for deformations in the contact areas and hence to vary the load according to useful values, controlled and selected as a function of the aforesaid effects.

The location of the loading cell in line, interposed between the outer race of the bearing and the actuator organ, enables to measure the mounting loads due to the tightening of the locking rings of the bearings or other elements, the axial operating loads due to thrusts on the tools, the thermal loads due to the differential expansions of the bodies. Moreover, the position of the cell allows, in an initial calibration, to measure the loads due to centrifugal forces.

Since the loading cell measures the loads actually applied on the bearings, the acquisition of the entire loading history of the bearings is enabled. By recording these data, it is then possible to perform the programmed maintenance of the bearings, scheduling their replacement, as needed, upon reaching the expected service life.

Naturally, the invention thus conceived can be subject to numerous technically equivalent modifications and variations, without thereby departing from the scope of the inventive concept which characterizes it as claimed below.

What is claimed is:

1. A device for measuring and adjusting preloading on at least one bearing surrounded by a casing and surrounding a shaft, the bearing having an outer race, said device comprising:

means for applying a preloading, said means being able to apply a thrust defining a preloading on the outer race of the bearing;

reaction means for applying a force counteracting the preloading force;

sensor means for instantaneously measuring the preloading; and a feedback control system for adjusting the preloading, wherein said means for applying a preloading and said reaction means are positioned to constitute a single actuator organ comprising: first and second ring elements for distributing the preloading, said first and second ring elements being opposite to one another and coaxial to the shaft and at least one of said first and second ring elements being destined to act against the outer race of the at least one bearing; two or more piezoelectric or magnetostrictive means interposed between said first and second ring elements for applying the preloading; return means interposed between said first and second ring elements; and connecting elements associated with said return means and interposed between said ring elements; and and said device further comprises an annular loading cell operatively adjacent said actuator organ and connected to said feedback control system for measuring and adjusting said preloading.

2. A device as claimed in claim 1, wherein said actuator organ comprises, interposed between said ring elements, two or more preloading units constituted each by two preloading means, positioned mutually opposite and acting in a converging manner on respective wings of one of the connecting elements, and two or more struts; each of said preloading means containing at least one of said piezoelectric or magnetostrictive means and having a first end that is supported in an articulated manner by one of said connecting elements, and a second end supported by one of said struts mounted in bridge-like fashion between said first and second ring elements, each of said struts being fastened with screws to the first ring element and being set against the second ring element.

3. A device as claimed in claim 2, wherein each of said struts has two sides that support in an articulated fashion two opposite preloading means afferent to two consecutive preloading units, thereby constituting a circumferential kinematic chain of the preloading units in a gap defined by said two ring elements.

4. A device as claimed in claim 2, wherein a hinge is provided in a junction portion between each connecting element and each preloading means and between each strut and each preloading means.

5. A device as claimed in claim 4, wherein said hinge is obtained through a weakening of said junction portion.

6. A device as claimed in claim 1, wherein each preloading means is positioned inclined between the two ring elements relative to the axis of said ring elements.

7. A device as claimed in claim 1, wherein each preloading means is positioned inclined between the two ring elements both relative to the axis of said ring elements, and relative to the radial direction of said ring elements.

8. A device as claimed in claim 1, wherein said return means are positioned transversely to join said connecting elements and one of said ring elements, and said return means comprise elastic means presenting a reduced resistance to traction in the direction in which the two ring elements are moved apart and with sufficient characteristics of elastic return.

9. A device as claimed in claim 1, wherein said loading cell is constituted by a multiplicity of identical circumferential joists, arranged in succession on an annular body, each of which joists presents, consecutively to the others, one end with reduced section and shaped in overhang in correspondence with a concavity presented by the annular body; in correspondence with the upper edge of said overhang ends being provided respective projections and in correspondence with the base of each of said overhang ends, in corresponding multiplicity, being provided sensors—strain gages positioned in pairs in bridge fashion on both sides of the overhang ends and connected with said feedback control system for measuring and adjusting the preloading.

10. A device as claimed in claim 9, wherein said projections are destined to bear with pressure against he outer race of the bearing.

11. A device as claimed in claim 1, wherein said actuator organ is positioned between a spacer integral with the casing that surrounds the shaft and the outer race of the bearing, with the interposition of the loading cell.

12. A device as claimed in claim 1, wherein the at least one bearing includes a first bearing and a second bearing, each having an outer race, and said actuator organ is positioned between the outer race of the first bearing and the outer race of the second bearing, with the interposition of the loading cell between said actuator organ and one of the bearings.

13. A device as claimed in claim 1, wherein said feedback control system for measuring and adjusting the preloading comprises a control unit, a calibration unit upstream of said control unit, and a power supply unit downstream of said control unit for the actuator organ; and wherein said loading cell in turn is connected to said control unit.

14. A device as claimed in claim 13, wherein the loading cell is further connected to a unit for recording the load conditions.

* * * * *